Aug. 21, 1945.  E. M. SPLAINE  2,383,021
OPHTHALMIC MOUNTING
Original Filed Jan. 3, 1938
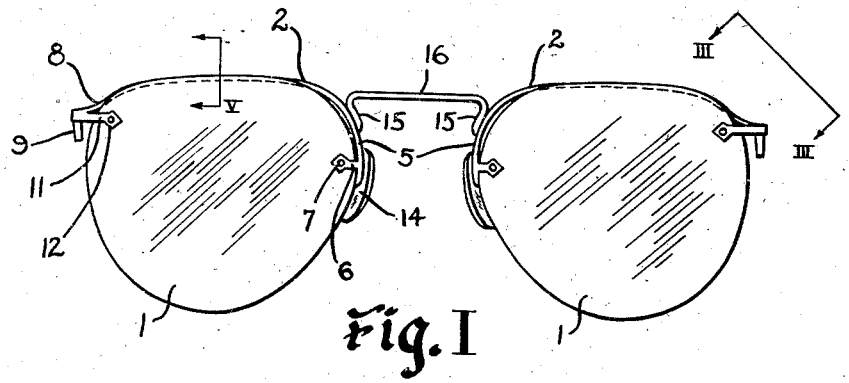
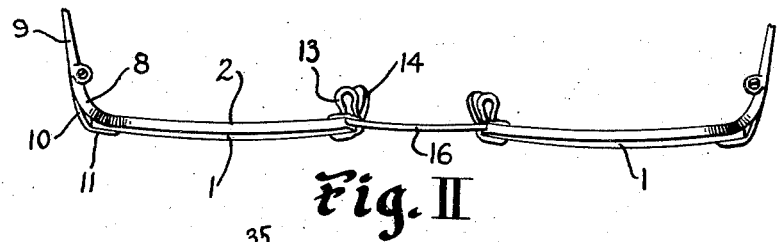
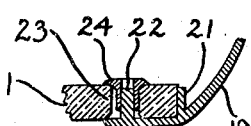
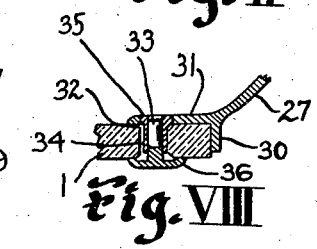
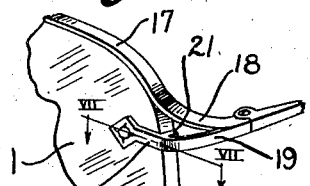
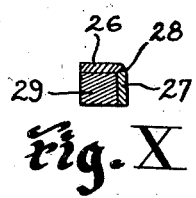
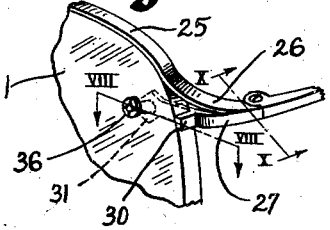
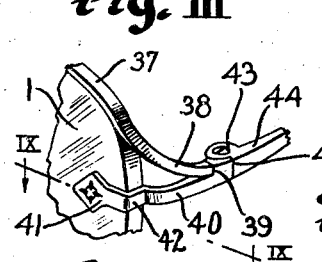
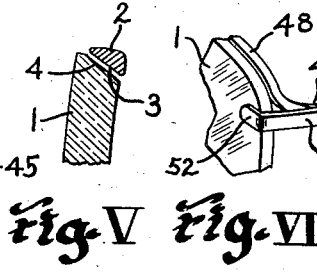
INVENTOR
EDWARD M. SPLAINE
BY
Louis L. Cagno
ATTORNEY Patented Aug. 21, 1945

2,383,021

UNITED STATES PATENT OFFICE 2,383,021

OPHTHALMIC MOUNTING

Edward M. Splaine, Southbridge, Mass., assignor to American Optical Company, Southbridge, Mass., a voluntary association of Massachusetts Original application January 3, 1938, Serial No. 182,936. Divided and this application June 30, 1941, Serial No. 400,419

4 Claims. (Cl. 88—41)

This invention relates to improvements in ophthalmic mountings and has particular reference to novel construction thereof.

This application is a division of my co-pending application Serial No. 182,936, filed January 3, 1938, now issued as Patent No. 2,256,502.

One of the principal objects of the invention is to provide an ophthalmic mounting having the major portion of its parts supporting the lenses before the eyes positioned above the useful field of vision, and so related with the lenses that a portion of said parts will be relatively inconspicuous and substantially invisible when the mounting is viewed from the front.

Another object is to provide an ophthalmic mounting with parts supporting the lenses extending from the upper temporal edges of the lenses to the nasal sides of said lenses so as to be above the normal line of straight ahead vision through the lenses, and so constructed as to retain said parts in desired relation with the lenses.

Another object is to provide a novel construction of mounting wherein the parts may be quickly and easily assembled.

Another object is to provide a novel construction wherein the parts may be quickly and easily adjusted to lenses having different contour shapes and to the facial requirements of different individuals, and which will be durable and efficient in properly supporting the lenses before the eyes and in maintaining said adjustments during use.

Other objects and advantages of the invention will become apparent from the following description, taken in connection with the accompanying drawing, and it will be apparent that many changes may be made in the details of construction and arrangement of parts, without departing from the spirit of the invention as expressed in the accompanying claims. I, therefore, do not wish to be limited to the exact details of construction and arrangement of parts shown and described, as preferred forms only have been given by way of illustration.

Referring to the drawing:

Fig. I is a front elevation of an ophthalmic mounting embodying the invention;

Fig. II is a plan view of the mounting illustrated in Fig. I;

Fig. III is a fragmentary perspective view of the temple and end piece construction of a slightly modified form of the invention, looking in the direction indicated by the arrows III—III in Fig. I;

Fig. IV is a view generally similar to Fig. III showing a modified construction;

Fig. V is an enlarged fragmentary sectional view taken as on line V—V of Fig. I;

Fig. VI is a view generally similar to Fig. IV showing a further modification;

Fig. VII is an enlarged fragmentary sectional view taken as on line VII—VII of Fig. III;

Fig. VIII is an enlarged fragmentary sectional view taken as on line VIII—VIII of Fig. IV;

Fig. IX is a view taken on line IX—IX of Fig. XI;

Fig. X is an enlarged sectional view taken as on line X—X of Fig. IV; and

Fig. XI is a view generally similar to Fig. III showing a further modification.

The usual designs of prior art ophthalmic mountings embodied two major constructions, one commercially known as a frame-type mounting and the other as a rimless type mounting.

Rimless type mountings were exceptionally desirable from the aesthetical viewpoint as they were relatively inconspicuous on the face. They were also desirable from the optical viewpoint because they provided unobstructed vision through the major portion of the contour edges of the lenses. Such mountings, however, were relatively delicate and very susceptible to becoming broken during use. This was due mostly to the fact that the supports for such mountings were relatively small and were connected directly to the lenses at the nasal and temple sides of said lenses and employed no additional means. The strain, such as is introduced when flexing temples outwardly during the placing of the mounting on the face or during the removing of the mounting from the face, was directed solely to said relatively small attachments and in many instances such strain was sufficient to break the lenses.

The above difficulties were greatly eliminated in frame-type mountings, as the strain created by flexing the temples was distributed throughout the contour edges of the lenses. This, however, required the use of rims which completely surrounded the lenses and, although desirable as regards the relieving of strain, these rims restricted vision throughout the contour edge of the lenses. The rims were also quite conspicuous when in position on the face.

It, therefore, is one of the primary objects of this invention to overcome the above difficulties by providing novel means of supporting the lenses so that all of the desirable features of both the frame and rimless type constructions will be retained and the undesirable features thereof will be eliminated.

Referring more particularly to the drawing wherein like characters of reference designate like parts throughout the several views, the device embodying the invention comprises, broadly, a pair of lenses 1 having bar-like supports 2 extending about the upper peripheral edges thereof. The bar-like supports 2 have an angled under surface 3 which is inclined so that the plane of said surface intersects the plane of the upper surface of said bar-like portions adjacent the front thereof, and extends downwardly toward the rear surface to produce a triangular cross-sectional shape. The inclined under-surface 3 is fitted in close relation with a similarly inclined edge surface 4 which is formed substantially throughout the upper contour edge of the lens and which extends from a point adjacent the upper temporal side of the lens to a point adjacent the upper nasal side of the lens. The relation of the upper inclined edges 4 and the bar-like portions 2 is such that the said bar-like portions will lie behind the inclined edges 4 and will be relatively inconspicuous when the mounting is viewed from the front.

Each of the bar-like members 2 is provided with a depending portion 5 which extends downwardly of the nasal side of each lens and which is shaped substantially to the contour shape of the lens at said location. The portions 5 are secured to suitable lens straps or lens holding means 6, which are in turn secured to the lenses by connecting means 7 which extend through aligned openings in the lens straps and lenses. The connecting means may be a screw, pin, or pin and tube held in assembled relation by solder or other suitable means.

The bar-like portions 2 are each provided with an outwardly and rearwardly extending temple support 8 adjacent the temporal ends thereof. The supports 8 are each provided with a hinge connection to which suitable temples 9 are attached. The supports 8 as shown in Figs. I and II are provided with brace means 10 which extend forwardly from adjacent the hinge connection to a portion 11 shaped to overlie the front surface of the lens. The portion 11 is secured to the lens by suitable connecting means extending through aligned openings in said portion 11 and lens. These brace members provide means for retaining the bar-like portions 2 in desired aligned relation with the upper peripheral edges of the lenses during use.

The depending portions 5 as shown in Figs. I and II provide means to which supporting arms 13 for nose pads 14 are secured. The said depending portions 5 also provide means to which the depending portions 15 of bridge member 16 are secured. The said depending portions 15 provide relatively long surface contact with portions 5 and thereby provide a durable construction. The said portions 15 may be secured to the portions 5 by soldering, welding or other suitable means.

In Figs. III and VII there is shown a slightly modified form of the invention wherein the bar-like portions 17 corresponding to the bar-like portions 2 are provided with downwardly, outwardly and rearwardly extending temple supports 18 formed integrally with said portions 17. Each of said portions 18 is provided with a bar-like brace 19 which is secured to the portion 18 adjacent the free end thereof and which extends forwardly substantially to the plane of the lenses to a portion 20 which is shaped to overlie the front surface of the lens. The portion 20 is provided with a rearwardly extending tongue 21 which is adapted to overlie the edge of the lens and engage with said edge. The portion 20 is also provided with a pin-like projection 22 which extends within an opening 23 in the lens as illustrated in Fig. VII. The said pin-like projection 22 is fitted in telescopic relation with a tubular member 24 having an enlarged flange-like head portion which is adapted to overlie the opening in the lens. The pin 22 and tubular member 24 are secured together by heat softenable binding means, such as solder, or other suitable adhesive.

In Figs. IV, VIII, and X, there is shown a further modification wherein the bar-like portions 25, corresponding to the portions 2 fitted about the upper peripheral edges of the lenses, are provided with downwardly, outwardly and rearwardly extending integral temple supports 26, similar to the supports 18. The said supports 26 are provided with bar-like brace means 27, which are secured to the portions 26 along the meeting edges 28 in Fig. X by soldering or other suitable means. The portions 26 and 27 are in angular relation with each other and are reinforced throughout their joined edges 28 by an internal block 29, which is secured to said portions 26 and 27 by solder or like means. The portion 27 is provided with an extension 30 which overlies and engages the edge of the lens and is also provided with a portion 31 shaped to overlie and engage the rear surface of the lens. The portion 31 is provided with an opening aligned with an opening 32 formed in the lens and is connected to said lens by a pin member 33 which extends within the hollow bore of a tubular member 34, and which is secured within said hollow bore by solder or other suitable adhesive means. The tubular member 34 is provided with an enlarged head 35 which engages the member 31 to limit the inner movement of said tubular member when the parts are being assembled. The pin member 33 is also provided with an enlarged head 36 which has an inturned circumferential edge which engages the front surface of the lens about the opening 32. This circumferential edge is spaced sufficiently from the opening 32 to relieve strain and danger of chipping the lens adjacent the opening.

In Figs. IX and XI there is shown a further modification wherein the bar-like portions 37, corresponding to the bar-like portions 2, 17, or 25, are provided with downwardly, outwardly and rearwardly extending temple supports 38, which engage a shouldered end portion 39 formed on brace means 40 having a portion 41 shaped to overlie the face of the lens and a portion 42 shaped to engage the edge of the lens. The shouldered portion 39 is secured to the end of the temple support 38 by solder or like means, with the outer surfaces of said portions 38 and 40 in substantially flush relation with each other. In this particular instance, the shouldered portion 39 is provided with a hinge connection 43 to which temple 44 is pivotally attached. It is to be particularly noted that the temple 44 is provided with a shouldered end 45 which abuts the portion 40 to limit the outward movement of the temple 44 about the hinge connection 43. The outer surfaces of the portion 40 and the temple 44 are adapted to assume a flush relation with each other when in the above position.

Portion 41 is provided with an opening in alignment with an opening in the lens and is secured to said lens by pin and tube-like connecting means 46 and 47 which are integrally joined by solder or other suitable adhesive.

In Fig. VI there is shown a further modification wherein the bar-like supports 48, corresponding to the supports 2, are shaped substantially to the same contour shape as the upper peripheral edges of the lenses, but are adapted to be supported in the rear of said upper peripheral edges and in a plane behind the plane of the lenses. In this particular instance, the bar-like supports 48 are provided with rearwardly extending end portions 49 which are secured to the rear surface of brace bars 50 to which the temples 51 are pivotally attached. The brace bars 50 are provided with a deflected forward end 52 which fits over the front surfaces of the lenses 1. The portions 52 are not secured to the lenses by attaching means, such as shown in Figs. VII, VIII and IX, but are adapted to be held in position on the lenses by the bar-like portions 48 and are adapted to hold the lenses between said bar-like portions and said deflected ends 52.

The bar-like portions 2, 17, 25, 37, or 48 may be formed of relatively rigid or pliable material, or may be formed of resilient material, or may have one or more of the above characteristics or, if desired, the said bar-like portions may be formed relatively rigid and the temple supporting portions formed relatively resilient, in which instance both the temple supports and adjacent brace bars would be formed resilient.

It is also to be noted that the bridge 16 may be formed of rigid, pliable or resilient material, or may have one or more of the above characteristics, that is, may be formed with different portions having these different characteristics.

From the foregoing description it will be seen that simple, efficient and economical means have been provided for accomplishing all of the objects and advantages of the invention.

Having described my invention, I claim:

1. A lens supporting structure for lenses of an ophthalmic mounting each having a connection opening adjacent the nasal and temporal sides thereof spaced inwardly of the adjacent edges of the lenses, said lens supporting structure comprising means for connecting the lenses adjacent the nasal sides and a pair of long and slender bar-like members secured to said means and shaped substantially to follow the shape of the upper contour edge of each lens and to overlie only one surface portion of said lens to facilitate adjustment of said bar-like member in the direction of said surface portion when assembled with said lenses, lens connection means comprising a perforated ear extending from adjacent one end of each of said bar-like members and adapted to overlie one of the side surfaces of a respective lens and being adapted to be aligned with the connection opening thereof, a washer-like part adapted to be positioned in overlying relation with the other side surface of said lens and with the said connection opening, a hollow tubular part being adapted to extend within the connection opening with the major portion thereof lying between the perforated ear and the washer-like part and connection means adapted to be extended within said tubular part and to function cooperatively with the perforated ear and the washer-like part to clamp the lens therebetween, said washer-like part being free to be moved bodily into engagement with the adjacent surface of the lens throughout its entire contour when the parts are being assembled and said hollow tubular part being separable from the ear.

2. An ophthalmic mounting embodying an assembly comprising lenses each having a connection opening adjacent the nasal and temporal sides thereof spaced inwardly of the adjacent edges of the lenses and a lens supporting structure for said lenses, said lens supporting structure comprising means connecting the lenses adjacent the nasal sides and a pair of long and slender bar-like members secured to said means and shaped substantially to follow the shape of the upper contour edge of each lens and to overlie only one surface portion of said lens to facilitate adjustment of said bar-like member in the direction of said surface portion, lens connection means comprising a perforated lens engaging ear extending from adjacent one end of each of said bar-like members and overlying one of the side surfaces of a respective lens and being alignable with a connection opening thereof, a washer-like part overlying the other side surface of the lens and the said connection opening, a hollow tubular part extending within the connection opening with the major portion thereof lying between the lens engaging ear and the washer-like part and connection means extending within said tubular part and functioning cooperatively with the perforated ear and the washer-like part to clamp the lens therebetween, said washer-like part being free to be moved bodily into engagement with the adjacent surface of the lens throughout its entire contour and said hollow tubular part being separable from the ear.

3. A lens supporting structure for lenses of an ophthalmic mounting each having a connection opening adjacent the nasal and temporal sides thereof spaced inwardly of the adjacent edges of the lenses, said lens supporting structure comprising means for connecting the lenses on the nasal sides and a pair of long and slender bar-like members secured to said means and shaped substantially to follow the shape of the upper contour edge of each lens and, throughout the major portion of the length thereof, to overlie only one surface portion of said lens when in position thereon and terminating in a temple supporting end portion on the temporal side of the lens, lens connecting means comprising a perforated ear extending from adjacent one end of each of said bar-like members and adapted to overlie one of the side surfaces of the respective lenses, said perforated ears each being supported by an adjustable brace bar secured adjacent one end thereof to said ear and at its opposite end to the bar-like member adjacent the temple supporting end portion and being bendable to align the perforation of the ear with the adjacent connection opening in the lens, a washer-like part overlying the other side surface of the lens and the said connection opening, a hollow tubular part adapted to be positioned within said connection opening with the major portion thereof lying between the perforated ear and the washer-like part and connection means adapted to extend within said tubular part and to function cooperatively with the perforated ear and the washer-like part to clamp the lens therebetween, said washer-like part being free to move bodily into engagement with the adjacent surface of the lens throughout its entire contour when the parts are being assembled with the lenses.

4. An ophthalmic mounting comprising a pair of lenses each having a connection opening on the nasal and temporal sides thereof spaced inwardly of the adjacent edges of said lenses, a lens supporting structure for said lenses comprising means connecting the lenses adjacent the nasal sides and a pair of long and slender bar-like members secured to said means and shaped substantially to follow the upper contour shape of each lens and, throughout the major portion of the length thereof, to overlie only one surface of said lens and terminating in a temple supporting end portion on the temporal side of the lens, lens connection means comprising a perforated ear extending from adjacent one end of each of said bar-like members and overlying one of the side surfaces of a respective lens, said lens engaging ears being supported by an adjustable brace bar secured adjacent one end thereof to said ear and at its opposite end to the bar-like member adjacent the temple end portion and being bendable to align the perforation in said ear with the adjacent connection opening in the lens, a washer-like part overlying the other side surface of the lens and the said connection opening, a hollow tubular part extending within the connection opening with the major portion thereof lying between the perforated ear and the washer-like part and connection means extending within said tubular part and functioning cooperatively with the perforated ear and the washer-like part to clamp the lens therebetween, said washer-like part being free to move bodily into engagement with the adjacent surface of the lens throughout its entire contour.

EDWARD M. SPLAINE.